United States Patent [19]

Chu

[11] Patent Number: 4,500,555
[45] Date of Patent: Feb. 19, 1985

[54] FISH SKINNING PROCESS
[75] Inventor: Wayne S. Chu, Agoura, Calif.
[73] Assignee: Ralston Purina Company, St. Louis, Mo.
[21] Appl. No.: 549,110
[22] Filed: Nov. 7, 1983
[51] Int. Cl.³ .............................................. A22C 25/17
[52] U.S. Cl. ......................................... 426/479; 17/50
[58] Field of Search ............... 17/21, 62, 50; 426/479, 426/480

[56] References Cited

U.S. PATENT DOCUMENTS 3,706,333  12/1972  Ammerman ........................... 17/50
3,806,616  4/1974   Mencacci et al. ................... 17/50 X

FOREIGN PATENT DOCUMENTS 2449405  10/1980  France .................................. 17/50

Primary Examiner—Willie G. Abercrombie
Attorney, Agent, or Firm—Virgil B. Hill

[57] ABSTRACT

The present invention relates to a process for the removal of skin from fish, such as tuna, in which an aqueous dispersion of an at least partially hydrolyzed, modified starch is applied to the skin of a precooked fish. Drying of the dispersion causes the skin to peel, thereby facilitating removal of the skin from the fish.

14 Claims, No Drawings

FISH SKINNING PROCESS

BACKGROUND OF THE INVENTION

The present invention generally relates to the processing of fish and particularly to the removal of skin or scale from fish such as tuna.

The processing of tuna entails taking tuna from the vessels to a tuna processing plant where the fish are initially beheaded, eviscerated, and then placed in containers for precooking. The precooking operation generally takes place in steam ovens or chambers as described in U.S. Pat. No. 3,594,196. Steam is used to precook the raw fish and precooking is carried out for a period of time that is between 0.5 and 10 hours depending upon the size of the fish being processed. After precooking, the fish are then allowed to cool at which time they are taken from the container in which they are cooked and placed on trimming tables where workers will manually remove the skin, bones and other portions of the fish considered unsuitable for human consumption. Skin or scale removal from the fish is a major step in the fish processing operation since it entails the use of manual labor to remove the skin from the fish and entails a considerable amount of time and skill. For example, the skin must typically be stripped by hand in which a knife is used as an assisting means in order to completely remove the skin from the fish. Therefore, a means of assisting in removal of the skin from tuna would represent a significant improvement in the processing of fish or tuna and provide a considerable savings in the costs of producing these products.

U.S. Pat. No. 3,806,616 describes a process for the skinning of fish in which a caustic solution is applied to the skin of the fish to saponify the fat therein and cause a partial dissolving of the skin after which the skin can be brushed or washed away. This type of procedure, however, involves the use of caustic and corrosive chemicals which can be harmful for a worker to handle and might also adversely effect the quality of the fish meat.

It would therefore be highly desirable if a means could be found for the skin removal from fish, such as tuna, which was simple and reliable to practice on a commercial scale and did not involve the use of chemicals not suitable for food usage or which are difficult to handle in a commercial operation.

SUMMARY OF THE INVENTION

The present invention involves a new and improved process for the skinning of fish such as tuna. It specifically involes the application of an at least partially hydrolyzed, modified starch dispersion to the skin of the fish followed by drying of the applied dispersion. Drying the applied starch dispersion causes the skin and the dried starch to bind tightly to cause at least partial peeling of the skin, thereby permitting easy removal of the skin by washing, brushing or other manual means.

The use of the aqueous starch dispersion to assist in the removal of the skin, not only provides a highly efficient process for the removal of skin from fish, but decreases the loss of edible flesh in the processing operation which would otherwise be lost by adherence to the skin during manual removal thereof. Furthermore, the aqueous starch dispersion provides a suitable coating for the fish which minimizes any undesirable or deleterious side effects to the fish thereby protecting the fish meat and providing better flavor quality during processing.

The effect of the starch on skin removal was entirely unexpected, but is believed to be at least partially due to the change in tensile strength of the skin with applied starch coating before and after drying of the starch dispersion thereby causing contraction of the skin. The present procedure therefore involves a highly efficient and desirable means of removing the skin from fish and permits the use of materials which are readily adaptable to practice of the process on a commercial basis.

It is therefore an object of the present invention to provide a process for the skin removal from fish.

It is a further object to provide a process for the removal of skin or scales from fish, particularly tuna.

It is a still further object to provide a process for assisting in the removal of skin or scales from fish such as tuna which is reliable to practice on a commercial basis.

DESCRIPTION OF THE PREFERRED EMBODIMENTS

Although the process of the present invention as it relates to the removal of skin or scales from a fish, is generally applicable to any type of fish or marine animal that entails the removal of skin for canning or further processing, nevertheless, the process is specifically described with regard to tuna since this is one type of seafood which involves a tremendous amount of manual processing in order to remove the skin, scales or other portions of the fish prior to canning.

Tuna, as they enter a commercial processing facility, can be frozen or partially frozen and are initially eviscerated and/or beheaded prior to being precooked. Usually, the whole fish are placed in baskets that are loaded upon wheel racks and the loaded racks are moved into a chamber which is substantially isolated from the atmosphere.

Following holding of the fish in the chamber, they are subjected to a precooking operation. Typically, precooking will be carried out by the use of a combination of steam and water which raises the temperature in the cooking chamber in order to precook the raw fish. The cooking operation lasts for a sufficient period of time to raise the temperature of fish or tuna meat as measured at the backbone to at least 135° F. It is, of course, apparent that the cooking time or temperature would vary depending on the species of fish being processed as well as the size thereof. In a normal precooking operation, there can be an appreciable amount of dehydration, losses due to cooking which can be somewhat ovecome by the addition of moisture or the use of saturated steam to thereby reduce any losses through dehydration of the skin.

Upon completion of the precooking, the fish are subjected to a cooling operation. This is accomplished by removing the fish from the precooking chamber, passing ambient or chilled air over the fish. It is also desirable, although not essential, to spray cooling water on the surface of the fish to prevent significant dehydration of the skin and assist in cooling because of the evaporative effect achieved by air passing over the moistened surface of the fish. The specific amount of time that the evaporative cooling operation will take place will vary considerably depended upon the size and species of fish being processed as well as the temperature of the air. A typical evaporative cooling operation would last for a time sufficient to reduce the temperature of the fish, as measured at the backbone, to about 100° F.

It is at this point in time, that it is desirable to apply an aqueous starch at dispersion to the surface of the fish to assist in the layer removal of the skin from the flesh. This step, however, can also be carried out simultaneously with the application of cooling water to assist in the cooling of the fish or may be employed as a subsequent step during ambient air cooling of the fish.

The particular type of starch that would be employed in the practice of the present invention is not entirely critical, however, the starch should be capable of achieving a glue-like state during cooking of the starch prior to application to the skin of the fish. Typically, this involves the use of an at least partially hydrolyzed, modified starch and the formation of an aqueous dispersion with the starch. The starch, in the form of an aqueous dispersion, is preferably further hydrolyzed by the application of heat and temperature to thereby place the starch in a glue-like state for application to the skin surface. A typical but non-limiting starch that may be employed in the present invention is a partially hydrolyzed chemically modified corn starch, identified as National "912", available from National Starch Company, Bridgewater, N.J. An aqueous dispersion of the starch is formed, wherein the starch is added to water in an amount of between about 5 and 50% by weight and preferably 20-30% by weight. The aqueous starch dispersion is then optionally further hydrolyzed by the application of heat, usually at a temperature of between about 180° to 215° F. for a period of time of between about 5 minutes and 24 hours. The exact temperature and time for hydrolysis of the starch is not critical to the practice of the invention and the starch dispersion will typically attain a thickened, glue-like or adhesive state which is readily discernible and it is at this point that it should be applied to the skin of the fish for ultimate peeling or removal of the skin. Further hydrolysis of the starch is not an essential element of the present invention since it is apparent that a dispersion of a prehydrolyzed starch or partially hydrolyzed starch can also be employed in the present invention.

As previously noted, a typical dispersion will contain between about 5 and 50% by weight of the starch. The exact amount of starch in the aqueous dispersion is not critical although the concentration of starch that is employed in the dispersion influences the drying rate of the dispersion. The aqueous dispersion of an at least partially hydrolyzed, modified starch is then applied to the skin of the fish and the exact means of application is not critical to the practice of the present invention and the dispersion may simply be sprayed on, brushed or applied in any manner which is deemed to be suitable and reliable for use on a commercial basis.

Following application of the aqueous dispersion of starch, the fish with applied dispersion is dried, as for example, during a holding or cooling period by the application of ambient air to thereby cause the skin and starch dispersion to bond, thereby facilitating peeling or removal of the skin from the fish following termination of the holding period.

The exact temperature of the air used for drying of the skin surface of the fish or the exact holding period is not critical to the practice of the present invention and, in fact, is entirely dependent upon the solids contained in the starch slurry, the size or species of fish involved as well as other factors unrelated to the specific process set forth in the present invention. Typically, ambient air will be employed to cool or dry the fish including the skin surface with the applied starch dispersion, although cooling air may also be employed to reduce the temperature to substantially below ambient thereby preventing any deterioration or microbiological contamination of the fish.

Following termination of the drying step, the dried aqueous starch dispersion and bonded skin contracts by virtue of moisture removal from the dispersion and causes the skin to peel or at least partially peel away from the fish flesh. Bonding of the skin and starch dispersion causes at least a partial peeling of the skin, thereby providing a means for easy removal of the skin from the surface of the fish. Skin removal may be effected by washing of the skin from the fish or by mechanical abrasion, as for example, by a brush or similar means. In any event, the present process provides a significant improvement in the art of fish processing wherein the skin may be readily and easily peeled from the fish flesh thereby providing a significant labor savings in this critical and important step in the processing of fish such as tuna.

The following example represents a specific but non-limiting embodiment of the present invention.

EXAMPLE

An aqueous starch dispersion was prepared by dispersing 1 lb of chemically modified corn starch identified as National "912", available from National Starch Company, Bridgewater, N.J. in 3 lb of tap water to provide a dispersion having a starch level of 25% by weight. The dispersion was heated at a temperature of 200° F. for 30 minutes to partially hydrolyze the starch, thereby bringing the starch dispersion to a "glue-like" adhesive state.

The starch dispersion in an adhesive condition was brushed on one side of each of the precooked tuna and then permitted to air dry for 3 hours. The starch dispersion was observed to have dried and bonded with the skin resulting in partial peeling of the skin. Peeling of the skin by hand from the side of the fish that had been coated with the starch dispersion was readily accomplished.

Having described the present invention relative to the specific embodiment described above, it is to be understood that numerous variations may be made without departing from the spirit of the present invention and it is intended to encompass such reasonable variations or equivalents within its scope.

What is claimed is:

1. A process of skinning fish comprising:
   a. applying an aqueous dispersion of an at least partially hydrolyzed starch to the skin of a fish;
   b. drying the skin with the applied dispersion thereby causing the skin to at least partially peel away from the fish, and
   c. removing the skin.

2. The process of claim 1 in which the dispersion has a starch level of between about 5 and 50% by weight.

3. The process of claim 2 in which the dispersion has a starch level of between about 20% to 30% by weight.

4. The process of claim 1 in which the fish is tuna.

5. The process of claim 1 in which the aqueous starch dispersion is heated to achieve an adhesive state.

6. The process of claim 5 in which the starch dispersion has been heated at a temperature of between about 180°-215° F. for between about 5 minutes and 24 hours.

7. The process of claim 1 in which the fish has been precooked prior to application of the starch dispersion.

8. A process of skinning fish comprising;
a. cooking the fish,
b. applying an aqueous dispersion of at least partially hydrolyzed starch to the skin of the fish wherein said dispersion has been heated to achieve an adhesive state;
c. drying the skin with the applied starch dispersion to thereby cause the skin to at least partially peel away from the fish, and
d. removing the peeled skin.

9. The process of claim 8 in which the dispersion has a starch level of between about 5 and 50% by weight.

10. The process of claim 9 in which the dispersion has a starch level of between about 20 to 30% by weight.

11. The process of claim 8 in which the fish is tuna.

12. The process of claim 8 in which the starch dispersion has been preheated at a temperature of about 180°–215° F. for between about 5 minutes and 24 hours.

13. The process of claim 8 wherein said cooked fish are cooled prior to application of said dispersion.

14. The process of claim 8 wherein said starch is a chemically modified starch.

* * * * *